United States Patent [19]

Funada et al.

[11] 4,299,450
[45] Nov. 10, 1981

[54] ELASTOMER DISPLAY

[75] Inventors: Fumiaki Funada, Yamatokoriyama; Toshiaki Takamatsu, Nara; Shigehiro Minezaki, Ikoma, all of Japan

[73] Assignee: Sharp Kabushiki Kaisha, Osaka, Japan

[21] Appl. No.: 66,320

[22] Filed: Aug. 14, 1979

[30] Foreign Application Priority Data

Aug. 18, 1978 [JP] Japan ................... 53-101192
Aug. 23, 1978 [JP] Japan ................... 53-103217

[51] Int. Cl.³ ............................................. G02F 1/29
[52] U.S. Cl. ........................... 350/360; 350/362
[58] Field of Search .......................... 350/360, 362

[56] References Cited

U.S. PATENT DOCUMENTS

| | | | |
|---|---|---|---|
| 3,196,011 | 7/1965 | Gunther et al. | 350/360 |
| 3,258,336 | 6/1966 | Ewing | 350/360 |
| 3,716,359 | 2/1973 | Sheridon | 350/360 |
| 4,119,368 | 10/1978 | Yamazaki | 350/360 |

*Primary Examiner*—William L. Sikes
*Assistant Examiner*—Léon Scott, Jr.
*Attorney, Agent, or Firm*—Birch, Stewart, Kolasch and Birch

[57] ABSTRACT

An elastomer display system comprising a transparent silicon elastomer and electrodes for establishing a nonuniform electric field in the transparent silicon elastomer. Organic fluorescent centers are disposed within the transparent silicon elastomer. The electrodes are shaped in a desired configuration to ensure creation of the frost deformation in the transparent silicon elastomer when a predetermined voltage signal is applied to the electrodes. The frost deformation functions as a scattering center for the fluorescence derived from the organic fluorescent centers, thereby displaying a desired pattern.

12 Claims, 11 Drawing Figures

ELASTOMER DISPLAY

BACKGROUND AND SUMMARY OF THE INVENTION

The present invention relates to an elastomer display and, more particularly, to a display system which utilizes a deformation effect of an elastomer under a predetermined electric field.

An elastomer display system is well known in the art, wherein a light beam applied to an elastomer is modulated through the use of deformation of the elastomer caused by a voltage signal applied thereto. The elastomer display system has a great advantage because of its low power drive characteristics.

However, the conventional elastomer display systems do not provide sufficient legibility because the elastomer does not emit light by itself. Moreover, in the conventional elastomer display system, relief deformation of the elastomer is utilized for display purposes and, therefore, an additional optical system such as the phase control system and the double refraction system is required to complete the display system.

Accordingly, an object of the present invention is to provide an elastomer display system of high legibility.

Another object of the present invention is to provide a fluorescent elastomer display system.

Still another object of the present invention is to provide an elastomer display system, wherein the frost deformation is created in the elastomer.

Yet another object of the present invention is to provide an electrode for the elastomer display system for ensuring the stable frost deformation in the elastomer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, electrodes are formed on both of the major surfaces of a transparent elastomer to create the frost deformation in the elastomer. Fluorescent centers are disposed in the transparent elastomer to generate the luminescence when a light beam is applied to the transparent elastomer. A scattering section is formed at a position where the frost deformation is created, thereby displaying a desired pattern through the use of the fluorescence derived from the fluorescent centers and scattered at the scattering section.

In a preferred form, the electrodes are mesh shaped or comb shaped to form a nonuniform electric field across the transparent elastomer. The thus formed nonuniform electric field creates the frost deformation in the transparent elastomer.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 2(A) and 2(B) are sectional views of the elastomer employed in the elastomer display system of FIG. 1, wherein FIG. 2(A) shows the off state, and FIG. 2(B) snows the on state;

DESCRIPTION OF THE PREFERRED EMBODIMENTS

Figure 1:
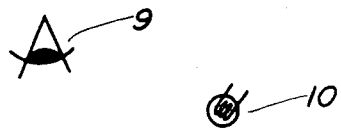
FIG. 1 is a sectional view of an embodiment of an elastomer display system of the present invention.
Figure 1:
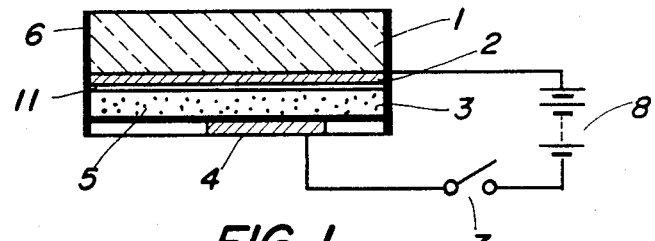

FIG. 1 schematically shows an embodiment of an elastomer display system of the present invention.

The elastomer display system mainly comprises a transparent substrate 1, a transparent electrode 2 formed on the transparent substrate 1, a counter electrode 4, and a transparent elastomer 3 disposed between the transparent electrode 2 and the counter electrode 4. The transparent electrode 2 and the counter electrode 4 are connected to a power supply source 8 via a switch 7, thereby establishing an electric field across the transparent elastomer 3.

Fluorescent centers 5 are included in the transparent elastomer 3 through the use of solution techniques or dispersion techniques. The counter electrode 4 must be a transparent electrode when the elastomer display system is the transparent type, but the counter electrode 4 need not necessarily be a transparent electrode when the elastomer display system is the reflection type. A conductive elastomer or liquid can be used as the electrode.

A reflection film 6 is provided to surround the edges of the transparent substrate 1, the transparent electrode 2 and the transparent elastomer 3, thereby preventing the light from emitting through surfaces other than the display surface. An observer 9 recognizes the display information which is formed by the fluorescent pattern caused by an exciting light applied from a light source 10.

The transparent elastomer 3 preferably has a refractive index greater than that of the transparent substrate 1, wherein the fluorescence from the fluorescent centers 5 is retained within the transparent elastomer 3 due to the total reflection. If the transparent elastomer 3 has a refractive index smaller than or equal to that of the transparent substrate 1, a transparent layer 11 is interposed between the transparent substrate 1 and the transparent elastomer 3, the transparent layer 11 having the refractive index smaller than that of the transparent elastomer 3. The above-mentioned refractive index relationship must also be satisfied on the side of the counter electrode 4, if the counter electrode 4 is not made of the reflective material.

The transparent elastomer 3 is required to provide the frost deformation (not only the relief deformation) when a predetermined electric field is applied across the transparent elastomer 3 through the use of the transparent electrode 2 and the counter electrode 4. The thus formed frost deformation functions to scatter the light beam. An operation mode of the elastomer display system of FIG. 1 will be described with reference to FIGS. 2(A) and 2(B).

The fluorescent centers 5 emit fluorescence $r_2$ when an exciting light $r_1$ is applied thereto. The thus developed fluorescence $r_2$ is transferred through the transparent elastomer 3 in a fashion similar to the optical fiber, and the majority of the fluorescence $r_2$ is accumulated in the transparent elastomer 3 along the plane perpendicular to the thickness of the transparent elastomer 3.

Figure 2:
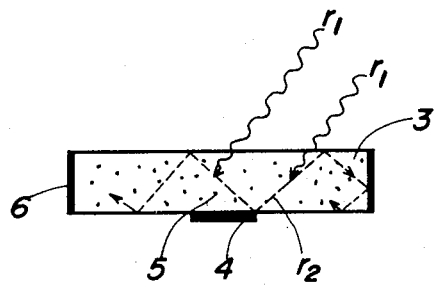
Figure 2:
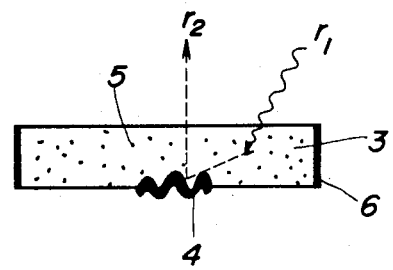

When the transparent elastomer 3 is not activated by the electric field, only a part of the fluorescence $r_2$ reaches the observer 9 and, therefore, he recognizes the "off" state (FIG. 2(A)). When a predetermined voltage is applied between the electrodes 2 and 4, the transparent elastomer 3 is activated and a frost deformation is created in the transparent elastomer 3. The thus created frost deformation functions as a scattering center. That is, the fluorescence $r_2$ is scattered by the frost deformation and reaches the observer 9 and, therefore, he recognizes the "on" state (FIG. 2(B)).

EXAMPLE

The transparent substrate 1 is made of quartz glass, Pyrex glass, sodium glass, plexi glass (an acryl plate), or polyethylene. The material of the transparent substrate 1 is selected in accordance with the absorption spectrum and the fluorescent spectrum of the fluorescent centers 5. The transparent substrate 1 has the thickness 0.5 mm to 3 mm. The transparent electrode 2 is made of $In_2O_3$ or $SnO_2$. If required, the transparent electrode 2 is shaped in a desired configuration through the use of an etching method or a masked evaporation method.

The low refractive index transparent layer 11 is formed on the transparent electrode 2 through the use an evaporation method or a painting method. Preferred materials for the transparent layer 11 are as follows:

$BaF_2$ (n=1.48)
$CaF_2$ (n=1.43)
$Na_5Al_5F_{14}$ (n=1.33)
$LiF$ (n=1.36)
$MgF_2$ (n=1.38)
$SiO_2$ (n=1.46)
$SrF_2$ (n=1.44)

The low refractive index transparent layer 11 has the thickness about 500 Å to 5000 Å.

The transparent elastomer 3 is preferably made of high refractive index silicon elastomer such as MP-011 (n=1.51) manufactured by Toray Silicone Co., Ltd. The silicon elastomer is painted on the transparent layer 11 to the thickness about 1 $\mu$m to 15 $\mu$m through the use of a spinner.

The counter electrode 4 comprises an elastic conductor including carbon grains distributed therein. An indium layer is formed on the elastic counductor to the thickness about 1000 Å through the use of an evaporation method, the indium layer functioning as a reflection layer. The counter electrode 4 must have a characteristic to allow the occurrence of the frost deformation in a transparent elastomer 3 when the predetermined voltage is applied between the electrodes 2 and 4.

The fluorescent centers 5 can be organic fluorescent materials. Preferred materials are as follows:

anthracene
tetracene
pyrene
fluorescein
9.10-dimethylanthracene
9.10-diphenylanthracene
perylene
fluorene
p-quaterphenyl
rubrence
2.5-diphenylfuran
2.5-diphenyloxazole
samaron brilliant yellow H6GL
brilliant phosphine
primulin O
acridine yellow
thioflavine S
rhodamine 6G perchrorate
pyronin G
pyronin B
cumarin 7
cumarin 10
cumarin 138
cumarin 337
europium thenoyltrifluoroacetonate trihydrate tris[4.4.4-trifluoro (2-thienyl)-1.3-butanedione] europium The power supply source 8 can be a DC voltage source, a DC pulse generator, or an AC pulse generator. Generally, the output level is below 100 V.

Figure 3:
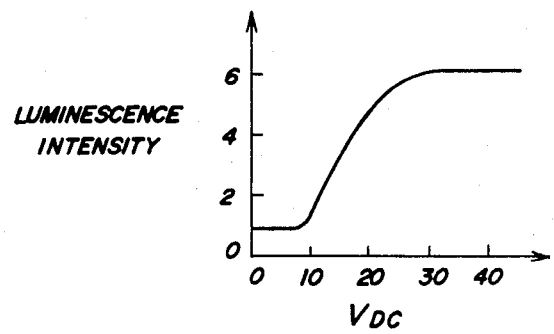
FIG. 3 is a graph showing a contrast characteristic of the elastomer display system of FIG. 1.

FIG. 3 shows the contrast characteristic of the elastomer display system of FIG. 1, wherein cumarin cumarin 7 manufactured by Eastman Kodok Co. is used for the fluorescent centers 5. The detection is conducted through the use of a light beam of the wavelength 550 nm. The response characteristic is about 10 msec to 100 msec, and the power consumption is about 0.01 $\mu W/cm^2$.

To ensure the creation of the frost deformation, it is necessary to establish a nonuniform electric field across the transparent elastomer 3.

Figure 4:
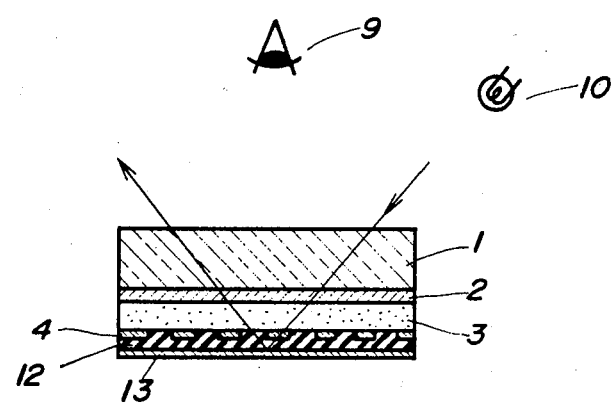
FIG. 4 is a sectional view of another embodiment of an elastomer display system of the present invention.

FIG. 4 shows another embodiment of the elastomer display system of the present invention, wherein the fluorescent centers are not disposed in the transparent elastomer 3.

That is, only the light beam derived from the light source 10 is used for display purposes. Like elements corresponding to those of FIG. 1 are indicated by like numerals.

The counter electrode 4, which is mesh shaped, is made of Al, Ni, Co, Au, $In_2O_3$, or $SnO_2$. An insulator layer 12 is formed on the counter electrode 4 to cover the transparent elastomer 3. The insulator layer 12 is made of an evaporated layer of $SiO_2$, $Al_2O_3$, $TiO_2$, $Y_2O_3$, or $Si_3N_4$, or a thin-film layer of an organic insulation material. A reflection layer 13 is formed on the insulator layer 12. The reflection layer 13 can be made of Al or Au, or a stacked layer of dielectric materials.

Figure 5:
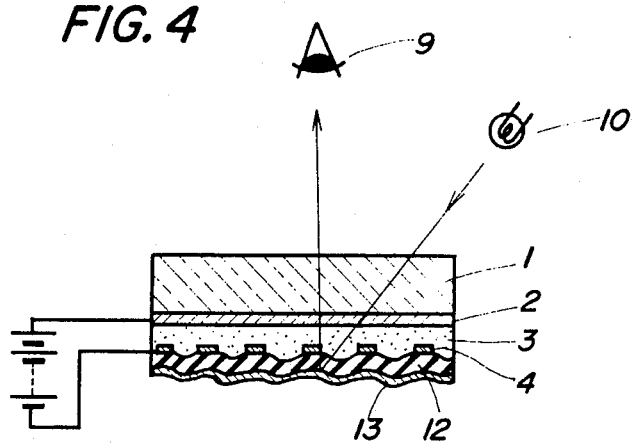
FIG. 5 is a sectional view showing an operation mode of the elastomer display system of FIG. 4.

When a predetermined voltage is applied between the transparent electrode 2 and the mesh-shaped counter electrode 4, the frost deformation is created in the transparent elastomer 3 due to the nonuniform electric field formed by the mesh-shaped counter electrode 4 as shown in FIG. 5.

Of course, the fluorescent centers can be added to the transparent elastomer 3.

EXAMPLE

The transparent substrate 1 is a float glass plate of 3 mm thick. An $In_2O_3$ layer of 500 Å thick is formed on the transparent substrate 1 through the use of electron beam evaporation techniques. The thus formed $In_2O_3$ layer is shaped in a desired pattern through the use of a photoetching method, thereby providing the transparent electrode 2. The transparent elastomer 3 comprises a silicon elastomer, such as MP-011 manufactured by Toray Silicone Co., Ltd., which is coated on the transparent electrode 2 to the thickness about 3 μm to 15 μm through the use of the spinner.

The counter electrode 4, made of Al, Au, Ni, In or Co, is formed on the transparent elastomer 3 through the use of an evaporation method or a spattering method to the thickness of about 1000 Å to 1 μm. Then, the counter electrode 4 is shaped in a desired pattern such as the mesh pattern through the use of the photoetching method.

Figure 6:
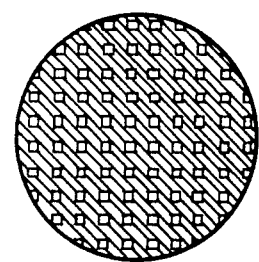
FIGS. 6, 7 and 8 are plan views of embodiments of an electrode employed in the elastomer display system of FIG. 4.
Figure 7:
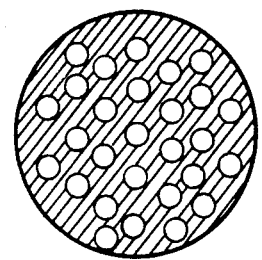
Figure 8:
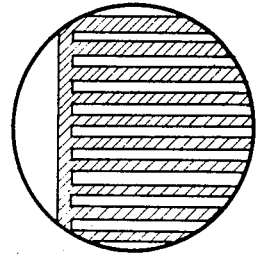

FIGS. 6, 7 and 8 show examples of the pattern of the counter electrode 4. The electrode pattern is not limited to the patterns shown in FIGS. 6, 7 and 8, but must have the shape to ensure the generation of the nonuniform electric field suited for forming the frost deformation.

The insulator layer 12 is preferably about 1 μm thick and made of CX52-003LTV manufactured by Toray Silicon Co., Ltd. As already discussed, the insulator layer 12 can be an inorganic layer made of $SiO_2$, $MgF_2$ or $Al_2O_3$. The reflection layer 13 is made of Al, Au or In, and formed to the thickness around 1000 Å through the use of the evaporation method.

Figure 9:
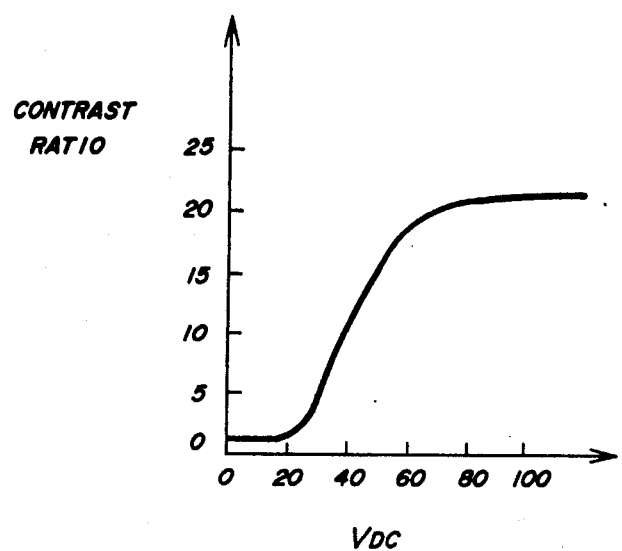
FIG. 9 is a graph showing a contrast characteristic of the elastomer display system of FIG. 4.

FIG. 9 shows the contrast ratio characteristic of the elastomer display system of FIG. 4, wherein the applied voltage is shown along the abscissa axis, and the contrast ratio is shown along the ordinate axis. The detection is carried out under the temperature 25° C., and the transparent elastomer 3 is about 5 μm thick. The response characteristic is as follows.

rise time 7 msec
decay time 5 msec
where the applied voltage is 50 V.

The reflection layer 13 can be made of a desired material when the counter electrode 4 is the transparent electrode made of, for example, $In_2O_3$ or $SnO_2$. However, if the counter electrode 4 is made of metal, the reflection layer 13 is preferably made of a material which shows the reflection characteristic similar to that of the counter electrode 4 for achieving a clean display.

Figure 10:
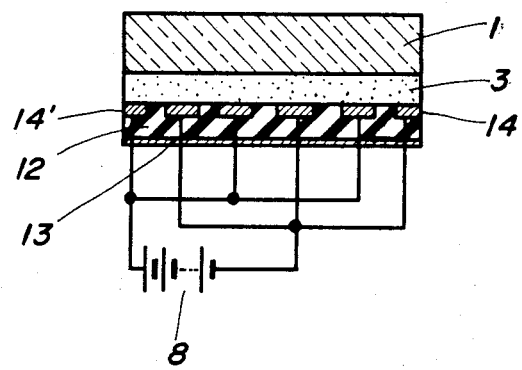
FIG. 10 is a sectional view of still another embodiment of an elastomer display system of the present invention.

FIG. 10 shows still another embodiment of the elastomer display system of the present invention. Like elements corresponding to those of FIG. 4 are indicated by like numerals.

In the embodiment of FIG. 10, the transparent electrode 2 is omitted, and the electrode pair is formed on one major surface of the transparent elastomer 3 in the interdigital fashion. More specifically, electrodes 14 and 14' form a prularity of pairs of electrodes.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A fluorescent elastomer display system comprising: a transparent silicon elastomer sandwiched in between an electrode configuration connected to a voltage source for producing a non-uniform electric field across said elastomer, and fluorescent centers dispersed within said transparent elastomer.

2. The flourescent elastomer display system of claim 1, wherein said transparent elastomer comprises a high refractive index silicon elastomer layer having a frost deformation pattern formed therein said pattern being formed in response to said non-uniform electric field established across said sandwiched configuration as a result of application of a pre-determined voltage to said electrodes.

3. The fluorescent elastomer display system of claim 1 or 2, wherein said fluorescent centers comprise organic fluorescent material.

4. A fluorescent elastomer display system comprising: a transparent substrate, a transparent electrode formed on said transparent electrode, a transparent silicon elastomer layer, having organic fluorescent centers dispersed therein, formed on said transparent electrode, a shaped counter-electrode formed on said silicon transparent elastomer layer, and a voltage source connected to said transparent electrode and counter electrode configuration for producing a non-uniform electric field across said elastomer layer forming a frost deformation pattern therein.

5. The elastomer display system of claim 4, wherein said transparent elastomer layer comprises a high refractive index silicon elastomer.

6. The elastomer display system of claim 5, further comprising a low refractive index transparent layer interposed between said transparent electrode and said high refractive index silicon elastomer layer, said low refractive index transparent layer functioning to reflect light from the high refractive index silicon elastomer layer.

7. The elastomer display system of claim 4, 5 or 6, wherein said counter electrode comprises a mesh shaped electrode.

8. The elastomer display system of claim 4, 5 or 6, wherein said counter electrode comprises a comb shaped electrode.

9. The elastomer display system of claim 4, 5 or 6, further comprising:
an insulator layer formed on said counter electrode; and
a reflection layer formed on said insulator layer.

10. The elastomer display system of claim 9, wherein said counter electrode comprises a metal electrode, and said reflection layer exhibits a reflection factor similar to that of said metal counter electrode.

11. A method of preparing a fluorescent elastomer display system which comprises:
providing a transparent silicon elastomer layer having fluorescent centers dispersed therein, said transparent silicon elastomer layer being interposed between a transparent electrode and a shaped counter electrode configuration, and
applying a voltage to said electrode configuration thereby providing a non-uniform electric field across said silicon elastomer layer, so as to produce a frost deformation pattern therein.

12. The method of claim 11 wherein said fluorescent centers comprise organic fluorescent material.

* * * * *